United States Patent [19]

Matsumura et al.

[11] Patent Number: 5,883,185
[45] Date of Patent: *Mar. 16, 1999

[54] WATER SOLUBLE FIBER-TREATING AGENT AND METHOD OF MAKING

[75] Inventors: Kazuyuki Matsumura; Mitsuo Asai; Shoji Ichinohe, all of Usui-gun, Japan

[73] Assignee: Shin-Etsu Chemical Co., Ltd., Japan

[*] Notice: The term of this patent shall not extend beyond the expiration date of Pat. No. 5,739,369.

[21] Appl. No.: 818,937

[22] Filed: Mar. 17, 1997

[30] Foreign Application Priority Data

Mar. 18, 1996 [JP] Japan ..................................... 8-088791

[51] Int. Cl.$^6$ ..................................................... C08L 83/06
[52] U.S. Cl. .................... 524/838; 524/837; 106/287.11; 106/287.14; 528/38; 528/42; 8/115.64; 8/DIG. 1
[58] Field of Search ........................ 106/287.11, 287.14; 524/838, 837; 528/38, 42; 8/115.64, DIG. 1

[56] References Cited

U.S. PATENT DOCUMENTS

| | | | |
|---|---|---|---|
| 3,837,876 | 9/1974 | Mayuzumi et al. | 106/287.11 |
| 3,961,977 | 6/1976 | Koda et al. | 106/287.11 |
| 4,783,222 | 11/1988 | Druschke | 106/287.13 |
| 5,053,081 | 10/1991 | Jacob | 106/287.11 |
| 5,250,322 | 10/1993 | Takahashi et al. | 427/226 |
| 5,739,369 | 4/1998 | Matsumura et al. | 556/425 |

FOREIGN PATENT DOCUMENTS 7-97770  6/1994  Japan .

OTHER PUBLICATIONS

Patent Abstracts of Japan, Publication No. 07097770 A, Apr. 11, 1995.

*Primary Examiner*—Margaret W. Glass
*Attorney, Agent, or Firm*—Miller, White, Zelano & Branigan, P.C.

[57] ABSTRACT

A fiber-treating agent is obtained by dissolving in water a reaction product resulting from co-hydrolysis and condensation of (A) a fluorinated alkyl group-containing alkoxysilane, (B) an alkyl group-containing alkoxysilane, (C) an amino group-containing alkoxysilane, and (D) an epoxy group-containing alkoxysilane. The fiber-treating agent is water soluble and thus safe while it imparts satisfactory water repellency, oil repellency, stain-proof property and even durable water repellency.

16 Claims, No Drawings

WATER SOLUBLE FIBER-TREATING AGENT AND METHOD OF MAKING

BACKGROUND OF THE INVENTION

1. Field of the Invention

This invention relates to a fiber treating agent for use in imparting water repellency, oil repellency and stain-proof property to such substrates as fiber articles. More particularly, it relates to a water soluble fiber-treating agent capable of treating fibers in a simple manner without a serious influence on the environment and a method for preparing the same.

2. Prior Art

Water repellent aerosol cans are commercially available as ready-for-use means for imparting water repellency to fabrics (typically, clothes) and leather. Typical are water repellent spray compositions based on fluoro-resin. Although Freon® analogues were used as the solvent in these water repellent spray compositions, they are now replaced by petroleum hydrocarbon solvents because of the recent concern on the environment as typified by ozone layer protection. The petroleum hydrocarbon solvents, however, can cause toxicosis to consumers. With the health and environment problems taken into account, there is a desire to have a safer water repellent spray composition.

From such a point of view, JP-A 97770/1995 discloses a spray composition comprising a silicone-acryl graft copolymer as a major component and an alcohol solvent. This composition, however, has problems that water repellency is not so high as provided by the fluoro-resin base compositions and no oil repellency is imparted. The alcohol solvent is less toxic, but not fully odorless.

SUMMARY OF THE INVENTION

Therefore, an object of the present invention is to provide a fiber-treating agent which not only imparts satisfactory water repellency, oil repellency, stain-proof property and even durable water repellency, but is also water soluble, safe, and shelf stable.

We have found that a reaction product resulting from co-hydrolysis and condensation among (A) a fluorinated alkyl group-containing alkoxysilane of formula (1) and/or a partial hydrolyzate thereof, (B) an alkyl group-containing alkoxysilane of formula (2) and/or a partial hydrolyzate thereof, (C) an amino group-containing alkoxysilane of formula (3) and/or a partial hydrolyzate thereof, and (D) an epoxy group-containing alkoxysilane of formula (4) and/or a partial hydrolyzate thereof, the formulae being shown below, is useful as an active ingredient of a fiber treating agent. Since the fluorinated alkyl group-containing silane compound, which is effective as a water repellent component, itself is given water solubility, this reaction product is readily soluble in water and fully shelf stable, and imparts satisfactory and long lasting water repellency. Also since active hydrogen of an amino group is appropriately blocked with the epoxy group-containing silane compound, fibers treated with this reaction product undergo less yellowing on their surface. That is, there is obtained a water soluble fiber-treating agent which has overcome the problems of prior art fiber treating agents. We have also found that the above-mentioned reaction product is consistently prepared by effecting (partial) co-hydrolysis between components (A) and (B) to form a (partial) hydrolyzate, effecting condensation reaction of the (partial) hydrolyzate with component (C), and then effecting further condensation reaction with component (D) to thereby form a co-hydrolysis/condensation reaction product. The present invention is predicated on these findings.

Components (A) to (D) are as defined below.

Fluorinated alkyl group-containing alkoxysilane (A) is of the following general formula (1):

wherein Rf is a polyfluoroalkyl group of the formula: $C_nF_{2n+1}$ wherein n is an integer of 1 to 20 or a polyfluoroalkyl group, which may contain at least one ether bond, of the formula:

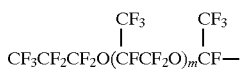

wherein m is an integer of at least 1; X is a linking group selected from the class consisting of —$CH_2$—, —$CH_2O$—, —$NR^3$—, —$CO_2$—, —$CONR^3$—, —S—, —$SO_3$—, and —$SO_2NR^3$—, wherein $R^3$ is a hydrogen atom or an alkyl group having 1 to 8 carbon atoms; $R^1$ is an alkyl group having 1 to 4 carbon atoms; $R^2$ is an alkyl group having 1 to 4 carbon atoms; and letter a is an integer of 0 to 3, b is an integer of 1 to 3, and c is equal to 0 or 1.

Alkyl group-containing alkoxysilane (B) is of the following general formula (2):

$$R^4Si(OR^6)_{3-d}\overset{R^6{}_d}{\vert}\qquad(2)$$

wherein $R^4$ is a monovalent hydrocarbon group having 1 to 10 carbon atoms; $R^5$ is an alkyl group having 1 to 4 carbon atoms; $R^6$ is an alkyl group having 1 to 4 carbon atoms; and letter d is equal to 0 or 1.

Amino group-containing alkoxysilane (C) is of the following general formula (3):

wherein $R^7$ and $R^8$ are independently selected from the class consisting of a hydrogen atom, an alkyl group having 1 to 15 carbon atoms, and an aminoalkyl group having 1 to 15 carbon atoms; $R^9$ is a divalent hydrocarbon group having 1 to 18 carbon atoms; $R^{10}$ is an alkyl group having 1 to 4 carbon atoms; $R^{11}$ is an alkyl group having 1 to 4 carbon atoms; and letter e is equal to 0 or 1.

Epoxy group-containing alkoxysilane (D) is of the following general formula (4):

wherein Q is a monovalent aliphatic or cycloaliphatic hydrocarbon group having an epoxy group; $R^{12}$ is a divalent hydrocarbon group which may contain an oxygen atom; $R^{13}$ is an alkyl group having 1 to 4 carbon atoms; $R^{14}$ is an alkyl group having 1 to 4 carbon atoms; and letter f is equal to 0 or 1.

Accordingly, the present invention provides a water soluble fiber-treating agent comprising a reaction product obtained by co-hydrolysis and condensation of components (A) to (D) dissolved in water. In another aspect, the present invention provides a method for preparing a water soluble fiber-treating agent comprising the steps of effecting (partial) co-hydrolysis between components (A) and (B) to form a (partial) hydrolyzate, effecting condensation reaction of the (partial) hydrolyzate with component (C), and then effecting further condensation reaction with component (D) to thereby form a co-hydrolysis/condensation reaction product.

DETAILED DESCRIPTION OF THE INVENTION

Component (A) is a fluorinated alkyl group-containing alkoxysilane of the following general formula (1).

$$Rf(CH_2)_aX(CH_2)_bSi(OR^1)_{3-c} \quad R^2_c \quad (1)$$

In formula (1), Rf is a polyfluoroalkyl group of the formula: $C_nF_{2n+1}$ wherein n is an integer of 1 to 20, preferably 3 to 18, or a polyfluoroalkyl group, which may contain at least one ether bond, of the formula:

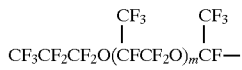

wherein m is an integer of at least 1, preferably 3 to 10. X is a linking group selected from the class consisting of —$CH_2$—, —$CH_2O$—, —$NR^3$—, —$CO_2$—, —$CONR^3$—, —S—, —$SO_3$—, and —$SO_2NR^3$—, wherein $R^3$ is a hydrogen atom or an alkyl group having 1 to 8 carbon atoms, preferably 1 to 2 carbon atoms. $R^1$ is an alkyl group having 1 to 4 carbon atoms. $R^2$ is an alkyi group having 1 to 4 carbon atoms. Letter a is an integer of 0 to 3, b is an integer of 1 to 3, and c is equal to 0 or 1, preferably equal to 0.

Examples of the polyfluoroalkyl group, which may contain at least one ether bond, are given below.

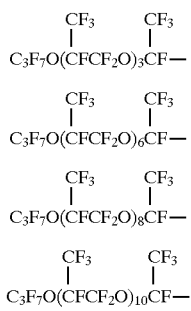

Illustrative, non-limiting examples of the silane of formula (1) are given below.

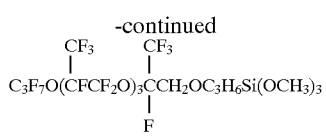

Especially useful among these compounds are $C_8F_{17}C_2H_4Si(OCH_3)_3$ and $C_8F_{17}C_3H_6Si(OCH_3)_3$.

In the practice of the invention, a partial hydrolyzate of the above-mentioned silane may also be used as component (A). At least one hydrolyzable group must be left in the hydrolyzate. If desired, a mixture of silanes or a partial hydrolyzate of mixed silanes may be used.

Component (B) is an alkyl group-containing alkoxysilane of the following general formula (2):

$$R^4Si(OR^6)_{3-d} \quad R^6_d \quad (2)$$

In formula (2), $R^4$ is a monovalent hydrocarbon group having 1 to 10 carbon atoms. $R^5$ is an alkyl group having 1 to 4 carbon atoms. $R^6$ is an alkyl group having 1 to 4 carbon atoms. Letter d is equal to 0 or 1. Examples of the monovalent hydrocarbon group include alkyl groups, alkenyl groups, aryl groups, aralkyl groups, and halogen-substituted ones of these groups, with the alkyl groups being preferred.

Illustrative, non-limiting examples of the silane of formula (2) are given below.

$C_{10}H_{21}Si(OCH_3)_3$
$C_8H_{17}Si(OCH_3)_3$
$C_6H_{13}Si(OCH_3)_3$
$C_{10}H_{21}Si(CH_3)(OCH_3)_2$
$C_8H_{17}Si(CH_3)(OCH_3)_2$
$C_6H_{13}Si(CH_3)(OCH_3)_2$
$(CH_3)_2Si(OCH_3)_2$
$(CH_3)_2Si(OC_2H_5)_2$

Especially useful among these compounds are $C_{10}H_{21}Si(OCH_3)_3$, $C_{10}H_{21}Si(CH_3)(OCH_3)_2$, and $(CH_3)_2Si(OCH_3)_2$.

In the practice of the invention, a partial hydrolyzate of the above-mentioned silane may also be used as component (B).

Component (C) is an amino group-containing alkoxysilane of the following general formula (3):

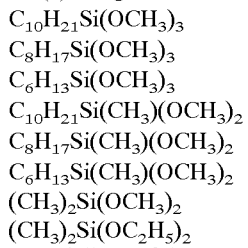

In formula (3), each of $R^7$ and $R^8$ is a hydrogen atom, an alkyl group having 1 to 15 carbon atoms, preferably 1 to 4 carbon atoms, or an aminoalkyl group having 1 to 15 carbon atoms, preferably 1 to 6 carbon atoms while $R^7$ and $R^8$ may be the same or different. $R^8$ is a divalent hydrocarbon group having 1 to 18 carbon atoms, preferably 1 to 6 carbon atoms, for example, alkylene, arylene, and alkylarylene groups. $R^{10}$ is an alkyl group having 1 to 4 carbon atoms. $R^{11}$ is an alkyl group having 1 to 4 carbon atoms. Letter e is equal to 0 or 1.

Illustrative, non-limiting examples of the amino-containing alkoxysilane of formula (3) are given below.

$H_2N(CH_2)_2Si(OCH_3)_3$
$H_2N(CH_2)_2Si(OC_2H_5)_3$
$CH_3NH(CH_2)_2Si(OCH_3)_3$
$CH_3NH(CH_2)_2Si(OC_2H_5)_3$
$H_2N(CH_2)_2SiCH_3(OCH_3)_2$ $H_2N(CH_2)_2SiCH_3(OC_2H_5)_2$
$CH_3NH(CH_2)_2SiCH_3(OCH_3)_2$
$CH_3NH(CH_2)_2SiCH_3(OC_2H_5)_2$
$H_2N(CH_2)_3Si(OCH_3)_3$
$H_2N(CH_2)_3Si(OC_2H_5)_3$
$CH_3NH(CH_2)_3Si(OCH_3)_3$
$CH_3NH(CH_2)_3Si(OC_2H_5)_3$
$H_2N(CH_2)_3SiCH_3(OCH_3)_2$
$H_2N(CH_2)_3SiCH_3(OC_2H_5)_2$
$CH_3NH(CH_2)_3SiCH_3(OCH_3)_2$
$CH_3NH(CH_2)_3SiCH_3(OC_2H_5)_2$
$H_2N(CH_2)_2NH(CH_2)_3Si(OCH_3)_3$
$H_2N(CH_2)_2NH(CH_2)_3Si(OC_2H_5)_3$
$CH_3NH(CH_2)_2NH(CH_2)_3Si(OCH_3)_3$
$CH_3NH(CH_2)_2NH(CH_2)_3Si(OC_2H_5)_3$
$H_2N(CH_2)_2NH(CH_2)_3SiCH_3(OC_3)_2$
$H_2N(CH_2)_2NH(CH_2)_3SiCH_3(OC_2H_5)_2$
$CH_3NH(CH_2)_2NH(CH_2)_3SiCH_3(OCH_3)_2$
$CH_3NH(CH_2)_2NH(CH_2)_3SiCH_3(OC_2H_5)_2$

Especially useful among these compounds are $H_2N(CH_2)_3Si(OCH_3)_3$, $H_2N(CH_2)_3Si(CH_3)(OCH_3)_2$, and $H_2N(CH_2)_2NH(CH_2)_3Si(OCH_3)_3$.

In the practice of the invention, a partial hydrolyzate of the above-mentioned silane may also be used as component (C).

Component (D) is an epoxy group-containing alkoxysilane of the following general formula (4):

$$Q-R^{12}Si(OR^{13})_{3-f} \quad | \quad R^{14}_f \quad (4)$$

In formula (4), Q is a monovalent aliphatic or cycloaliphatic hydrocarbon group having an epoxy group, preferably

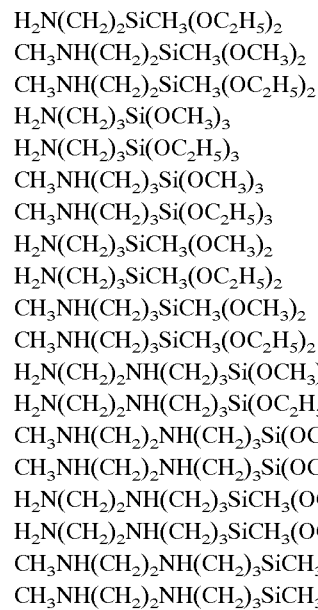

$R^{12}$ is a divalent hydrocarbon group which may contain an oxygen atom, preferably having 2 to 12 carbon atoms, more preferably 4 to 8 carbon atoms, for example, $-CH_2CH_2-$, $-CH_2CH_2CH_2OCH_2-$, $-(CH_2)_4-$, $-(CH_2)_8-$, and

$R^{13}$ is an alkyl group having 1 to 4 carbon atoms. $R^{14}$ is an alkyl group having 1 to 4 carbon atoms. Letter f is equal to 0 or 1.

Illustrative, non-limiting examples of the epoxy-containing alkoxysilane of formula (4) are given below.

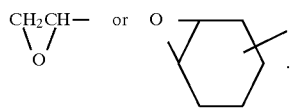

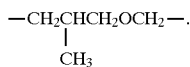

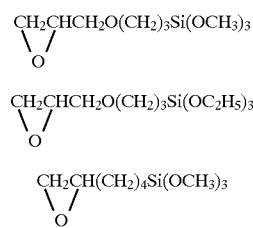

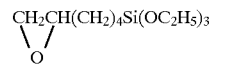

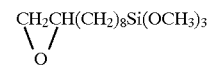

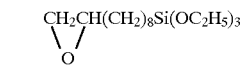

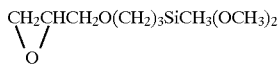

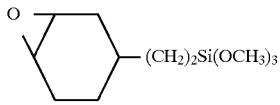

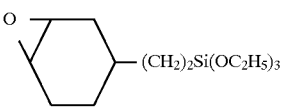

In the practice of the invention, a partial hydrolyzate of the above-mentioned silane may also be used as component (D).

The water soluble fiber-treating agent of the invention has a co-hydrolysis/condensation reaction product of components (A) to (D) dissolved in water. The reaction product of components (A) to (D) can be obtained by co-hydrolysis and condensation reaction of components (A) to (D), preferably in the presence of an organic or inorganic acid. Most often, the reaction product is obtained by first effecting partial co-hydrolysis between components (A) and (B) in the presence of an organic or inorganic acid to form a partial hydrolyzate, then reacting the partial hydrolyzate with component (C), and finally reacting the hydrolyzate with component (D) because the thus obtained reaction product is stable.

The organic and inorganic acids which can be used in effecting partial co-hydrolysis between components (A) and (B) include hydrochloric acid, sulfuric acid, methanesulfonic acid, formic acid, acetic acid, propionic acid, citric acid, palmitic acid, stearic acid, oleic acid, malonic acid, succinic acid, glutaric acid, oxalic acid, and maleic acid alone or in admixture of two or more. Acetic acid and propionic acid are preferred. The acid is preferably used in an amount of 5 to 400 parts, especially 10 to 350 parts by weight per 100 parts by weight of components (A) and (B) combined. With less than 5 parts of the acid, hydrolysis would proceed slowly and an aqueous solution of a composition would become less stable. The acid catalyst is added in a controlled amount such that a system dissolved in water may be at pH 7 to 3.

Co-hydrolysis is preferably carried out while the components are diluted with a solvent. Preferred solvents are alcoholic solvents, for example, methanol, ethanol, 1-propanol, 2-propanol, 1-butanol, 2-butanol, 3-butanol, and 2-methyl-2-butanol, with 3-butanol being especially preferred.

The solvent is preferably used in an amount of 100 to 500 parts, especially 200 to 400 parts by weight per 100 parts by weight of components (A) and (B) combined. Less than 100 parts of the solvent would allow condensation to proceed rather than hydrolysis whereas more than 500 parts of the solvent would require a longer time for hydrolysis to proceed.

Preferably the molar amount of water added for effecting co-hydrolysis between components (A) and (B) is 1 to 3 times, especially 1.25 to 2.5 times the molar amount of components (A) and (B) combined. Per mol of components (A) and (B) combined, less than 1 mol of water would leave more alkoxy groups whereas more than 3 mol of water would allow condensation to proceed.

Preferred reaction conditions for co-hydrolysis between components (A) and (B) include a reaction temperature of 10° to 100° C., especially 60° to 90° C. and a time of 1 to 3 hours.

The molar ratio of component (A) to component (B) preferably ranges from 1:0.05 to 1:0.5, especially from 1:0.08 to 1:0.2. Per mol of component (A), less than 0.05 mol of component (B) would adversely affect durability whereas more than 0.5 mol of component (B) would adversely affect water solubility and oil repellency.

A reaction product resulting from co-hydrolysis between components (A) and (B) is successively subject to condensation reaction with component (C). Component (C) is preferably used in such an amount that the molar ratio of components (A) and (B) combined to component (C) preferably ranges from 1:0.5 to 1:20, especially from 1:1 to 1:10. Per mol of components (A) and (B) combined, less than 0.5 mol of component (C) would adversely affect water solubility whereas more than 20 mol of component (C) would adversely affect water repellency and cause considerable discoloration of fibers treated with the final reaction product.

Preferred conditions for reaction of component (C) include a reaction temperature of 60° to 100° C. and a time of 1 to 3 hours.

A reaction product resulting components (A), (B) and (C) is successively subject to condensation reaction with component (D). Component (D) is preferably used in such an amount that the molar ratio of component (C) to component (D) preferably ranges from 1:0.8 to 1:2, especially from 1:1 to 1:1.5. Per mol of component (C), less than 0.8 mol of component (D) would cause considerable discoloration of fibers treated with the final reaction whereas more than 2 mol of component (D) would adversely affect water solubility.

Preferred conditions for reaction of component (D) include a reaction temperature of 60° to 100° C. and a time of 1 to 3 hours.

The water soluble fiber-treating agent of the invention is an aqueous solution containing a reaction product of components (A) to (D) as a major or active ingredient. The reaction product is preferably diluted with water such that the concentration of the reaction product is 0.1 to 10% by weight, especially 1 to 3% by weight, that is, the concentration of water is 99.9 to 90% by weight, especially 99 to 97% by weight. If the concentration of water exceeds 99.9% by weight, the solution would fail to exert its function or must be applied in excess. If the concentration of water is less than 90% by weight, the solution would be less shelf stable.

Any of well-known additives such as surfactants and alcohols may be added to the water soluble fiber-treating agent of the invention for the purpose of improving the stability of the aqueous solution as long as the objects of the invention are not impaired. Metallic curing catalysts such as Al, Sn and Zn may also be added if desired.

The thus obtained water soluble fiber-treating agent is applied to articles of synthetic and natural fibers, fabric, leather and paper by conventional simple methods such as dipping and spray coating. After drying, the treated articles are given satisfactory water and oil repellency.

Since the major component, fluorinated alkyl group-containing silane compound itself is given water solubility, the fiber treating agent of the invention is readily soluble in water and fully shelf stable. The fiber treating agent is not detrimental to the environment since it is aqueous. The water repellency thus imparted lasts long. Fibers treated with the agent undergo less yellowing. There is also described a method capable of producing the reaction product in a stable manner.

EXAMPLE

Examples of the invention are give below by way of illustration and not by way of limitation.

Synthesis Example 1

A 1-liter four-necked flask equipped with a stirrer, condenser, thermometer, and dropping funnel was charged with 115 grams (0.202 mol) of $C_8F_{17}(CH_2)_2Si(OCH_3)_3$, 2.4 grams (0.020 mol) of $(CH_3)_2Si(OCH_3)_2$, 400 grams of 3-butanol, 12.2 grams (0.202 mol) of acetic acid, and 5.4 grams (0.3 mol) of water. With stirring, the flask was heated until reflux of 3-butanol started. Reaction was continued for 2 hours. Thereafter, 36.2 grams (0.202 mol) of $N_2H(CH_2)_3Si(OCH_3)_3$ was added dropwise to the flask through the dropping funnel. Under reflux of 3-butanol, reaction was effected for one hour. Thereafter, 47.6 grams (0.202 mol) of the compound of the following formula (5):

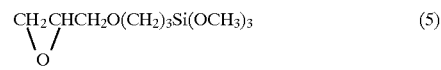

was added dropwise to the flask through the dropping funnel. Under reflux of 3-butanol, reaction was effected for one hour, yielding a pale yellow clear solution.

Synthesis Example 2

The procedure of Synthesis Example 1 was repeated except that 44.4 grams (0.202 mol) of the compound of the following formula (6):

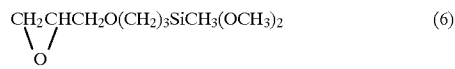

was used instead of the compound of formula (5), yielding a pale yellow clear solution.

Synthesis Example 3

A 1-liter four-necked flask equipped with a stirrer, condenser, thermometer, and dropping funnel was charged with 115 grams (0.202 mol) of $C_8F_{17}(CH_2)_2Si(OCH_3)_3$, 2.4 grams (0.020 mol) of $(CH_3)_2Si(OCH_3)_2$, 400 grams of 3-butanol, 12.2 grams (0.202 mol) of acetic acid, and 5.4 grams (0.3 mol) of water. With stirring, the flask was heated until reflux of 3-butanol started. Reaction was continued for 2 hours. containing Thereafter, 36.2 grams (0.202 mol) of $N_2H(CH_2)_3Si(CH_3)_3$ was added dropwise through the dropping funnel. Under reflux of 3-butanol, reaction was effected for one hour, yielding a pale yellow clear solution.

Examples 1–2 and Comparative Example

Water soluble fiber-treating solutions were prepared by diluting the products of Synthesis Examples 1 to 3 with water such that the concentration of the active component was 2% by weight. The solutions were allowed to stand at room temperature for one month, finding no change. Note that Example 1, Example 2, and Comparative Example used the products of Synthesis Examples 1, 2 and 3, respectively.

The treating solutions were sprayed to polyester fiber taffeta, nylon taffeta and cotton broadcloth and dried in air for one day. The treated samples were subject to a spray type water repellency test of JIS L-1092 (1986) and an oil repellency test of AATCC TM118 (1966). The samples were also measured for a contact angle with water and hexadecane. The results are shown in Tables 1 to 3.

Water Repellency Test

Using a sprayer, water was sprayed to a sample surface. The surface state was examined for water repellency according to the following criterion.

0: front and back surfaces are entirely wet

5: only surface is entirely wet

70: half of surface is wet and tiny discrete water droplets penetrate through the fabric 80: surface is wetted with tiny discrete water droplets 90: surface wetting is not acknowledged, but tiny water droplets attach to surface 100: surface is free of wetting and water droplet attachment Oil Repellency Test using a dropping pipette, droplets with a diameter of about 4 mm of hydrocarbon compounds having different surface tensions were placed on a sample surface at three points. The oil penetrating state after 30 seconds was observed and rated according to the following criterion.

Degree of oil repellency

8: no penetration with n-heptane having a surface tension of 20.0 dyn/cm

7: no penetration with n-octane having a surface tension of 21.8 dyn/cm

6: no penetration with n-decane having a surface tension of 23.5 dyn/cm

5: no penetration with n-dodecane having a surface tension of 25.0 dyn/cm

4: no penetration with n-tetradecane having a surface tension of 26.7 dyn/cm

3: no penetration with n-hexadecane having a surface tension of 27.3 dyn/cm

2: no penetration with a 35/65 (wt %) mixture of n-hexadecane/nujol having a surface tension of 29.6 dyn/cm 1: no penetration with nujol having a surface tension of 31.2 dyn/cm 0: below oil repellency "1"

Contact Angle

Contact angles with water and hexadecane were measured at five different points on a sample surface. With maximum and minimum values omitted, an average of three measurements was calculated.

TABLE 1

Water repellency

|  | Polyester fiber taffeta | Nylon taffeta | Cotton broadcloth |
| --- | --- | --- | --- |
| Example 1 | 100 | 100 | 100 |
| Example 2 | 100 | 100 | 100 |
| Comparative Example | 70 | 70 | 50 |

TABLE 2

Oil repellency

|  | Polyester fiber taffeta | Nylon taffeta | Cotton broadcloth |
| --- | --- | --- | --- |
| Example 1 | 5 | 5 | 7 |
| Example 2 | 4 | 5 | 6 |
| Comparative Example | 0 | 0 | 3 |

TABLE 3

| | Contact angle with water | | | Contact angle with hexadecane | | |
| --- | --- | --- | --- | --- | --- | --- |
| | Polyester fiber taffeta | Nylon taffeta | Cotton broadcloth | Polyester fiber taffeta | Nylon taffeta | Cotton broadcloth |
| Example 1 | 125° | 123° | 147° | 90° | 89° | 120° |
| Example 2 | 122° | 120° | 145° | 88° | 85° | 110° |
| Comparative Example | 110° | 61° | 43° | 32° | 39° | 23° |

The treating solutions were also examined for yellowness by the following method. The results are shown in Table 4.

Yellowness Measurement

Cotton broadcloth pretreated with a fluorescent brightener (Mikawhite KNT conc.) was dipped in the treating solution, dried at 100° C. for 2 minutes in a drying machine, and then heated at 150° C. for 2 minutes. The thus treated cloth was heated at 200° C. for 30 seconds using an iron. Using a colorimetric chromoscope, the treated cloth was measured for color before and after ironing, from which a yellowness index was calculated.

TABLE 4

| | Example 1 | | Example 2 | | Comparative Example | |
| --- | --- | --- | --- | --- | --- | --- |
| | As treated | As ironed | As treated | As ironed | As treated | As ironed |
| b value* | −4.9 | −1.2 | −4.2 | −0.8 | 0.7 | 4.5 |

*b value is a numerical value representing a color change between yellow (+) and blue (−) among numerical values obtained by measuring the color of the treated cloth by a colorimetric chromoscope model ND-101D by Nippon Denshi Kogyo K.K.

Furthermore, the treating solutions were sprayed to polyester fiber taffeta and dried at 100° C. for 2 minutes and then at 150° C. for a further 2 minutes. The treated sample was examined for durability of water repellency by the following method. The results are shown in Table 5.

Durable water repellency test

The treated fabric was dipped in a detergent liquid containing 5 grams of sodium alkylbenzenesulfonate and 2 grams of sodium carbonate in 1 liter of water. A household clothes washer was filled with warm water at 50° C. together with the detergent liquid in a bath ratio of 1/100 and operated for 15 minutes. The washed fabric was subject to the spray type water repellency test.

TABLE 5

| Drying after spraying | Number of washing cycles | | | | | |
|---|---|---|---|---|---|---|
| | 0 | 1 | 2 | 3 | 4 | 5 |
| E1 Air drying | 100 | 100 | 100 | 100 | 100 | 100 |
| Heat drying | 100 | 100 | 100 | 100 | 100 | 100 |
| E2 Air drying | 100 | 100 | 100 | 100 | 100 | 100 |
| Heat drying | 100 | 100 | 100 | 100 | 100 | 100 |
| CE Air drying | 70 | 50 | 50 | 50 | 50 | 0 |
| Heat drying | 80 | 80 | 70 | 50 | 50 | 50 |

Japanese Patent Application No. 88791/1996 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A water soluble fiber-treating agent comprising a reaction product dissolved in water, said reaction product being obtained by co-hydrolysis and condensation of (A) a fluorinated alkyl group-containing alkoxysilane of the following general formula (1) and/or a partial hydrolyzate thereof:

(1)

wherein Rf is a polyfluoroalkyl group of the formula: $C_nF_{2n+1}$ wherein n is an integer of 1 to 20 or a polyfluoroalkyl group, which contains at least one ether bond, of the formula:

wherein m is an integer of at least 1; X is a linking group selected from the class consisting of —$CH_2$—, —$CH_2O$—, —$NR^3$—, —$CO_2$—, —$CONR^3$—, —S—, —$SO_3$—, and —$SO_2NR^3$—, wherein $R^3$ is a hydrogen atom or an alkyl group having 1 to 8 carbon atoms; $R^1$ is an alkyl group having 1 to 4 carbon atoms; $R^2$ is an alkyl group having 1 to 4 carbon atoms; and letter a is an integer of 0 to 3, b is an integer of 1 to 3, and c is equal to 0 or 1;

(B) an alkyl group-containing alkoxysilane of the following general formula (2) and/or a partial hydrolyzate thereof:

(2)

wherein $R^4$ is a monovalent hydrocarbon group having 1 to 10 carbon atoms; each $R^6$ is independently an alkyl group having 1 to 4 carbon atoms; and letter d is equal to 0 or 1, (C) an amino group-containing alkoxysilane of the following general formula (3) and/or a partial hydrolyzate thereof:

(3)

wherein $R^7$ and $R^8$ are independently selected from the class consisting of a hydrogen atom, an alkyl group having 1 to 15 carbon atoms, and an aminoalkyl group having 1 to 15 carbon atoms; $R^9$ is a divalent hydrocarbon group having 1 to 18 carbon atoms; $R^{10}$ is an alkyl group having 1 to 4 carbon atoms; $R^{11}$ is an alkyl group having 1 to 4 carbon atoms; and letter e is equal to 0 or 1, and (D) an epoxy group-containing alkoxysilane of the following general formula (4) and/or a partial hydrolyzate thereof:

(4)

wherein Q is a monovalent aliphatic or cycloaliphatic hydrocarbon group having an epoxy group; $R^{12}$ is a divalent hydrocarbon group which may contain an oxygen atom; $R^{13}$ is an alkyl group having 1 to 4 carbon atoms; $R^{14}$ is an alkyl group having 1 to 4 carbon atoms; and letter f is equal to 0 or 1.

2. A method for preparing a water soluble fiber-treating agent comprising the steps of:

effecting partial co-hydrolysis between components (A) and (B) to form a (partial) hydrolyzate, effecting condensation reaction of the (partial) hydrolyzate with component (C), and then effecting further condensation reaction with component (D) to thereby form a co-hydrolysis/condensation reaction product, wherein said components (A) to (D) are:

(A) a fluorinated alkyl group-containing alkoxysilane of the following general formula (1) and/or a partial hydrolyzate thereof:

(1)

wherein Rf is a polyfluoroalkyl group of the formula: $C_nF_{2n+1}$ wherein n is an integer of 1 to 20 or a polyfluoroalkyl group, which contains at least one ether bond, of the formula:

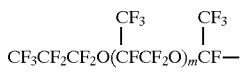

wherein m is an integer of at least 1; X is a linking group selected from the class consisting of —$CH_2$—, —$CH_2O$—, —$NR^3$—, —$CO_2$—, —$CONR^3$—, —S—, —$SO_3$—, and —$SO_2NR^3$—, wherein $R^3$ is a hydrogen atom or an alkyl group having 1 to 8 carbon atoms; $R^1$ is an alkyl group having 1 to 4 carbon atoms; $R^2$ is an alkyl group having 1 to 4 carbon atoms; and letter a is an integer of 0 to 3, b is an integer of 1 to 3, and c is equal to 0 or 1;

(B) an alkyl group-containing alkoxysilane of the following general formula (2) and/or a partial hydrolyzate thereof:

$$R^4Si(OR^6)_{3-d} \quad \overset{R^6{}_d}{|} \quad (2)$$

wherein $R^4$ is a monovalent hydrocarbon group having 1 to 10 carbon atoms; each $R^6$ is independently an alkyl group having 1 to 4 carbon atoms; and letter d is equal to 0 or 1, and (C) an amino group-containing alkoxysilane of the following general formula (3) and/or a partial hydrolyzate thereof:

$$\overset{R^7}{\underset{R^8}{\diagdown}}NR^9Si(OR^{10})_{3-e} \quad \overset{R^{11}{}_e}{|} \quad (3)$$

wherein $R^7$ and $R^8$ are independently selected from the class consisting of a hydrogen atom, an alkyl group having 1 to 15 carbon atoms, and an aminoalkyl group having 1 to 15 carbon atoms; $R^9$ is a divalent hydrocarbon group having 1 to 18 carbon atoms; $R^{10}$ is an alkyl group having 1 to 4 carbon atoms; $R^{11}$ is an alkyl group having 1 to 4 carbon atoms; and letter e is equal to 0 or 1, and (D) an epoxy group-containing alkoxysilane of the following general formula (4) and/or a partial hydrolyzate thereof:

$$Q-R^{12}Si(OR^{13})_{3-f} \quad \overset{R^{14}{}_f}{|} \quad (4)$$

wherein Q is a monovalent aliphatic or cycloaliphatic hydrocarbon group having an epoxy group; $R^{12}$ is a divalent hydrocarbon group which may contain an oxygen atom; $R^{13}$ is an alkyl group having 1 to 4 carbon atoms; $R^{14}$ is an alkyl group having 1 to 4 carbon atoms; and letter f is equal to 0 or 1.

3. A method of treating fibers, comprising contacting fibers with an agent according to claim 1, whereby water-repellency, oil repellency or stain-repellency are imparted to said fibers.

4. A fiber treated according to claim 3.

5. An agent according to claim 1, wherein $R_f$ is $$C_3F_7O(CFCF_2O)_3CF- \quad \overset{CF_3}{|}\overset{CF_3}{|}$$

$$C_3F_7O(CFCF_2O)_6CF- \quad \overset{CF_3}{|}\overset{CF_3}{|}$$

$$C_3F_7O(CFCF_2O)_8CF- \quad \overset{CF_3}{|}\overset{CF_3}{|}$$

$$C_3F_7O(CFCF_2O)_{10}CF-. \quad \overset{CF_3}{|}\overset{CF_3}{|}$$

6. An agent according to claim 1, wherein the alkoxysilane(1) is $C_8F_{17}C_3H_6Si(OCH_3)_3$    $C_8F_{17}C_3H_6Si(OC_2H_5)_3$ $C_8F_{17}CONHC_2H_4Si(OCH_3)_3$    $C_8F_{17}CONHC_2H_4Si(OC_2H_5)_3$ or -continued $$C_3F_7O(CFCF_2O)_3CCH_2OC_3H_6Si(OCH_3)_3. \quad \overset{CF_3}{|}\overset{CF_3}{|}\underset{F}{|}$$

7. An agent according to claim 6, wherein the alkoxysilane (1) is $C_8F_{17}C_2H_4Si(OCH_3)_3$ or $C_8F_{17}C_3H_6Si(OCH_3)_3$.

8. An agent according to claim 1, wherein the alkoxysilane (2) is $C_{10}H_{21}Si(OCH_3)_3$ $C_8H_{17}Si(OCH_3)_3$ $C_6H_{13}Si(OCH_3)_3$ $C_{10}H_{21}Si(CH_3)(OCH_3)_2$ $C_8H_{17}Si(CH_3)(OCH_3)_2$ $C_6H_{13}Si(CH_3)(OCH_3)_2$ $(CH_3)_2Si(OCH_3)_2$ or $(CH_3)_2Si(OC_2H_5)_2$.

9. An agent according to claim 8, wherein the alkoxysilane (2) is $C_{10}H_2Si(OCH_3)_3$, $C_{10}H_{21}Si(CH_3)(OCH_3)_2$ or $(CH_3)_2Si(OCH_3)_2$.

10. An agent according to claim 1, wherein the alkoxysilane (3) is $H_2N(CH_2)_2Si(OCH_3)_3$ $H_2N(CH_2)_2Si(OC_2H_5)_3$ $CH_3NH(CH_2)_2Si(OCH_3)_3$ $CH_3NH(CH_2)_2Si(OC_2H_5)_3$ $H_2N(CH_2)_2SiCH_3(OCH_3)_2$ $H_2N(CH_2)_2SiCH_3(OC_2H_5)_2$ $CH_3NH(CH_2)_2SiCH_3(OCH_3)_2$ $CH_3NH(CH_2)_2SiCH_3(OC_2H_5)_2$ $H_2N(CH_2)_3Si(OCH_3)_3$ $H_2N(CH_2)_3Si(OC_2H_5)_3$ $CH_3NH(CH_2)_3Si(OCH_3)_3$ $CH_3NH(CH_2)_3Si(OC_2H_5)_3$ $H_2N(CH_2)_3SiCH_3(OCH_3)_2$ $H_2N(CH_2)_3SiCH_3(OC_2H_5)_2$ $CH_3NH(CH_2)_3SiCH_3(OCH_3)_2$ $CH_3NH(CH_2)_3SiCH_3(OC_2H_5)_2$ $H_2N(CH_2)_2NH(CH_2)_3Si(OCH_3)_3$ $H_2N(CH_2)_2NH(CH_2)_3Si(OC_2H_5)_3$ $CH_3NH(CH_2)_2NH(CH_2)_3Si(OCH_3)_3$ $CH_3NH(CH_2)_2NH(CH_2)_3Si(OC_2H_5)_3$ $H_2N(CH_2)_2NH(CH_2)_3SiCH_3(OCH_3)_2$ $H_2N(CH_2)_2NH(CH_2)_3SiCH_3(OC_2H_5)_2$ $CH_3NH(CH_2)_2NH(CH_2)_3SiCH_3(OCH_3)_2$ or $CH_3NH(CH_2)_2NH(CH_2)_3SiCH_3(OC_2H_5)_2$.

11. An agent according to claim 10, wherein the alkoxysilane (3) is $H_2N(CH_2)_3Si(OCH_3)_3$, $H_2N(CH_2)_3Si(CH_3)(OCH_3)_2$, or $H_2N(CH_2)_2NH(CH_2)_3Si(OCH_3)_2$.

12. An agent according to claim 1, wherein Q is

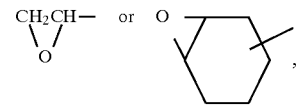

and $R^{12}$ is $-CH_2CH_2-$, $-CH_2CH_2CH_2OCH_2-$, $-(CH_2)_4-$, $-(CH_2)_8-$, or

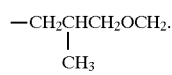
13. An agent according to claim 1, wherein the alkoxysilane (4) is
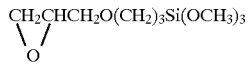
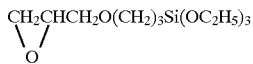
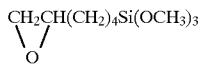
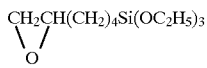
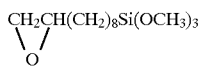
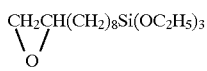
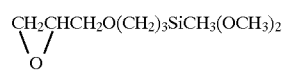
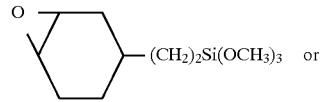
or
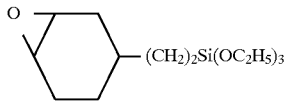
14. An agent according to claim 1, wherein X is —$CH_2O$—, $NR^3$—, —$CO_2$-, —$CONR^3$—, —S—, —$SO_3$— or —$SO_2NR^3$—.
15. An agent according to claim 1, wherein $R^7$ is $C_{1-15}$-alkyl or $C_{1-15}$-aminoalkyl.
16. An agent according to claim 15, wherein $R^7$ is $C_{1-15}$-aminoalkyl.
* * * * *